United States Patent
Petzold et al.

(10) Patent No.: US 8,746,426 B2
(45) Date of Patent: Jun. 10, 2014

(54) THROUGH-CONNECTION CLUTCH AND METHOD FOR THE ACTUATION THEREOF

(75) Inventors: Rainer Petzold, Friedrichshafen (DE); Peter Herter, Ravensburg (DE); Mario Steinborn, Friedrichshafen (DE); Franz Bitzer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 165 days.

(21) Appl. No.: 13/511,241

(22) PCT Filed: Nov. 3, 2010

(86) PCT No.: PCT/EP2010/066679
§ 371 (c)(1),
(2), (4) Date: May 22, 2012

(87) PCT Pub. No.: WO2011/069751
PCT Pub. Date: Jun. 16, 2011

(65) Prior Publication Data
US 2012/0234641 A1    Sep. 20, 2012

(30) Foreign Application Priority Data
Dec. 10, 2009 (DE) .......................... 10 2009 047 766

(51) Int. Cl.
*F16D 25/061* (2006.01)
*F16D 25/0635* (2006.01)
*F16D 25/10* (2006.01)

(52) U.S. Cl.
USPC .... 192/53.5; 192/53.1; 192/85.18; 192/85.48

(58) Field of Classification Search
CPC ............... F16D 2023/0693; F16D 2500/10456
USPC ..................................... 192/53.1, 53.5, 85.18
See application file for complete search history.

(56) References Cited

U.S. PATENT DOCUMENTS

| | | | | |
|---|---|---|---|---|
| 2,891,645 A | * | 6/1959 | Hindmarch | 192/53.5 |
| 3,048,247 A | * | 8/1962 | Cook et al. | 192/53.32 |
| 3,063,529 A | * | 11/1962 | Cook | 192/53.5 |
| 3,161,270 A | * | 12/1964 | Aschauer | 192/53.1 |
| 6,315,691 B1 | | 11/2001 | Fredriksen et al. | |
| 2009/0218190 A1 | | 9/2009 | Reuschel et al. | |

FOREIGN PATENT DOCUMENTS

| | | |
|---|---|---|
| DE | 42 00 998 A1 | 7/1993 |
| DE | 42 01 234 A1 | 7/1993 |
| DE | 196 19 981 A1 | 11/1997 |

(Continued)

*Primary Examiner* — Rodney Bonck
(74) *Attorney, Agent, or Firm* — Davis & Bujold, PLLC; Michael J. Bujold

(57) ABSTRACT

A through-connection clutch, for transferring torque between a motor and transmission of a vehicle, which has a friction clutch and a form-locking clutch. The form-locking clutch is disposed radially within the friction clutch, and the clutches can be actuated independently of each other. To minimize the required installation space, the through-connection clutch can be activated flexibly, but is still inexpensive to produce and ensures low-wear yet safe and comfortable torque transfer in a drive train of a vehicle. A pressure plate of the friction clutch and a form-locking element of the form-locking clutch are concentric, rotationally fixed together, and movable toward one another, and can be actuated via an actuation unit, which is rotationally decoupled from the pressure plate and the form-locking element. Depending on the operating situation, the friction clutch and/or the form-locking clutch is selectively activated one or more times.

9 Claims, 1 Drawing Sheet

(56) References Cited

FOREIGN PATENT DOCUMENTS

| | | |
|---|---|---|
| DE | 199 24 512 C1 | 4/2000 |
| DE | 10 2009 009 145 A1 | 9/2009 |
| FR | 64076 | 10/1955 |
| FR | 2802995 A1 | 6/2001 |
| GB | 879436 | 10/1961 |
| WO | 2006/110945 A1 | 10/2006 |

\* cited by examiner

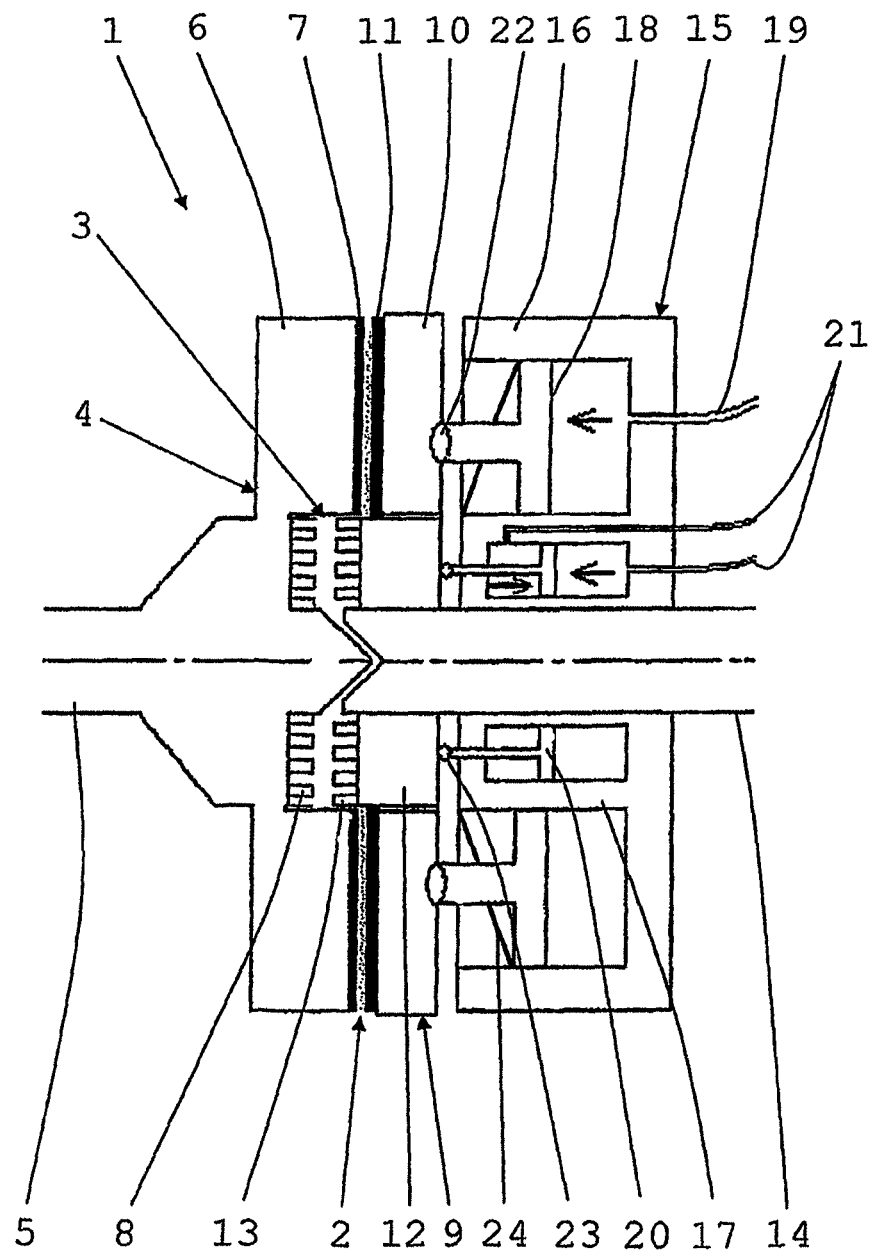

THROUGH-CONNECTION CLUTCH AND METHOD FOR THE ACTUATION THEREOF

This application is a National Stage completion of PCT/EP2010/066679 filed Nov. 3, 2010, which claims priority from German patent application no. 10 2009 047 766.7 filed Dec. 10, 2009.

FIELD OF THE INVENTION

The invention relates to a through-connection clutch and to a method for activating a through-connection clutch.

BACKGROUND OF THE INVENTION

In motor vehicles, particularly commercial vehicles, increasingly high demands are made for transferring forces in the drive train. Therefore, using a customary friction clutch for transferring torque from a drive motor to an input shaft of a vehicle transmission leads to structurally ever larger clutch constructions due to the correlation between the radius of the friction surfaces and the torque to be transferred, as well as consideration of the friction capability and the thermal load capacity of the materials used. However, the construction space in modern vehicles is limited by a variety of aggregates and design specifications so that possibilities are sought for limiting the construction size despite the increasing demands.

An increase of the contact forces of the friction surfaces of the friction clutch with the same or smaller radius would lead to higher demands on the actuator system and therefore would require more costly pneumatic or hydraulic control equipment and more complex activation, particularly costly faster electronic regulators for handling the specified control cycles. Higher contact forces with a greatly reduced clutch radius could also lead to undesirable vibration behavior with high-frequency components, or also to juddering vibrations which negatively impact the wear and operating comfort. In addition, new friction materials that are more highly loadable are currently not available, or at any rate, are very expensive.

In order to circumvent this problem, it would appear that a reduction of the construction size of the friction clutch or an increased transfer of torque with the same size clutch without impairing the driving comfort and increasing the risk of premature wear of the clutch is only attainable by drastically reducing the loading phases of the clutch. This can be achieved if the period in which the friction clutch is slipping is kept as short as possible, and the friction clutch is bridged after attaining the frictional connection.

If during travel, that is, not during creeping or idling, the clutch is slip-free while the engine drive shaft and the transmission input shaft are at the same rotational speed, then the friction clutch can be replaced by a rotationally rigid coupling between the engine and the transmission input. The required radius of an engageable clutch for producing such a rigid connection can be small in comparison to the radius of typical friction clutch discs; in principle, the radius can even be reduced to the shaft radius of the shafts to be connected. A reduction in loading of the friction clutch typically used between the engine and the transmission can therefore be attained by using the friction clutch only briefly for synchronizing the two clutch sides, and otherwise producing a form-locking connection between the input side and the output side of the clutch.

A clutch system that fulfills these requirements must therefore comprise a friction clutch and a form-locking clutch, or a coupling clutch, that are configured in parallel in the power flow.

The document WO 2006/110945 A1 discloses such a clutch arrangement in which a form-locking clutch designed as a dog clutch is disposed radially within a friction clutch designed as a multi-disc clutch. A first, outer hydraulic actuating piston that actuates the friction clutch is positioned within a first cylinder. The outer actuating piston for its part actuates a pot-like second cylinder which receives a second, inner hydraulic actuating piston that actuates the dog clutch. Both actuating pistons are fastened to a drive shaft in an axially movable manner. A disc spring device that preloads the actuating piston in a disengaged position is supported between the outer actuating piston and a disc packet, whose outer discs are connected as a clutch input side to the drive shaft and whose inner discs are connected as a clutch output side to an output shaft. The inner actuating piston on the input side supports an arrangement of projecting claws, which correspond to a commensurate output-side arrangement of recesses that is disposed on the output shaft. A first, outer pressure chamber disposed upstream on the face side is provided for pressurizing the outer actuating piston. A second pressure chamber for pressurizing the inner actuating piston is formed between the outer actuating piston and the inner actuating piston, so that the two actuating pistons and therefore the friction clutch and the dog clutch can in principle be actuated independently of each other.

A disadvantage here is that both actuating pistons are components of the rotating system, whereby relatively large undesirable centrifugal forces can act on the bearing and flow of lubricant. In addition, the inner actuating piston must be moved with a displacement of the outer actuating piston in the engaging direction. Conversely, the inner actuating piston can only return to the initial position thereof if the outer actuating piston was previously placed in the initial position thereof. As a result, the activation possibilities are limited.

Furthermore, a clutch arrangement for a distributor gearing of an all-wheel drive vehicle is known from the document DE 42 00 998 A1. A dog clutch and a friction clutch are disposed therein. The dog clutch can be actuated via an engagement member that acts upon a shifting fork, which pushes a first clutch half designed as a sliding collar onto a spline shaft in order to couple to a second clutch half on a drive shaft. This dog clutch serves to connect, as required, a main drive shaft, particularly a rear-axle drive, to a power take-off shaft, particularly a front-axle drive. The friction clutch connected in parallel in the power flow serves only for synchronizing the two shafts. A disadvantage here is that the dog clutch is axially upstream of the friction clutch such that the arrangement has a relatively long construction length. In addition, the design of the actuation of the dog clutch is relatively complex. The functions of a startup clutch for startup, maneuvering, rolling or coasting are not described therein.

The document DE 42 01 234 A1 shows a gear coupling having a shift member with a gearing, that is disposed in a slidable manner on a drive part, and a counter member having a counter gearing, that is disposed in a rigid manner on an output part. Friction surfaces are assigned to the shift member and the counter member, and these surfaces enter into frictional engagement before the toothed connection, in order to synchronize the drive part and the output part. A disadvantage here is that although the friction clutch is functionally upstream of the toothed engagement, the two clutch functions cannot be controlled independently of each other.

SUMMARY OF THE INVENTION

Based on this background, the object of the present invention is to develop a clutch arrangement having a friction clutch and a coupling clutch of the initially described type that requires the least possible construction space, can be activated flexibly, and yet, can be produced cost-effectively. A further object is specifying a method for activating such a clutch that ensures low wear and yet guarantees reliable and comfortable transfer of torque in a drive train of a vehicle having the clutch.

The invention is based on the realization that transferring high torques, for example between an engine and a transmission in the drive train of a commercial vehicle, with a small clutch friction diameter can be realized by the inclusion of a form-locking clutch part in an empty interior space of a friction mechanism of a friction clutch. Thereby, a simple, cost-effective arrangement can be attained in that the friction mechanism and the clutch part can be actuated by a separate actuation unit, disposed concentrically around a transmission input shaft, that is not a component of the rotating friction parts and clutch parts.

Accordingly, the invention is based on a through-connection clutch, for transferring torque between a drive motor and a transmission of a motor vehicle, for example, having an activateable friction clutch and having an engageable form-locking clutch, wherein the form-locking clutch is disposed radially within the friction clutch, and the friction clutch and the form-locking clutch can be actuated independently of each other. In order to achieve the stated object, the invention provides that a pressure plate of the friction clutch and a form-locking element of the form-locking clutch are disposed concentrically, rotationally fixed together, and movable against each other, and can be actuated via an actuation unit that is rotationally decoupled from the pressure plate and the form-locking element.

Furthermore, the invention is based on a method for activating a through-connection clutch for transferring torque between a drive motor and a transmission of a motor vehicle, having an activateable friction clutch and having an engageable form-locking clutch, wherein the form-locking clutch is disposed radially within the friction clutch, and the friction clutch and the form-locking clutch can be actuated independently of each other. The stated object with respect to the method is achieved in that depending on the operating situation, the friction clutch and/or the form-locking clutch are selectively activated once or multiple times.

Here, for producing a force-locking connection of the drive motor and the transmission, it can be provided that initially by activating the friction clutch in the direction of engagement, an engine rotational speed and a transmission input rotational speed are synchronized, and then once the rotational speeds have been equalized, the form-locking clutch is engaged and the friction clutch is completely disengaged.

A through-connection clutch is understood to be a clutch arrangement with a controllable friction clutch and an engageable form-locking clutch that form a structural unit, wherein the friction clutch is provided predominantly for regulating the rotational speed and the form-locking clutch is provided for transferring torque between a clutch input side and a clutch output side.

Accordingly, the friction clutch does not need to be designed for the maximum engine torque, but rather only for the maximum torque necessary for startup, and can accordingly be dimensioned with a relatively smaller diameter. In the case that maximum torque is required however, apart from startup, maneuvering or shifting procedures, the form-locking clutch performs the torque transfer which requires only a small diameter, and is disposed in a space-saving manner concentrically within the friction clutch.

The invention implements such a clutch system with a particularly simple, compact and cost-effective design in which a pressure plate of the friction clutch and a form-locking element of the form-locking clutch are separated from an actuation unit.

The actuation unit can advantageously comprise a radially outer actuating piston for the friction clutch and a radially inner actuating piston for the form-locking clutch, wherein each actuating piston is guided, and controlled by means of a pressure medium, preferably pneumatically controlled, in an individual actuating cylinder. Accordingly, the friction clutch component of the through-connection clutch can be designed as a clutch to be engaged by engagement force, thus as a "normally disengaged" clutch.

This design is particularly advantageous, because when form-locking is present, the friction clutch is not used, and thus, by simply relieving pressure can be disengaged, or kept disengaged. As a result, there is additional security because undesired engagement of the clutch is avoided, for example due to an inadequate pneumatic or hydraulic seal of the actuating cylinder at very low ambient temperatures.

The complete control of the clutch by means of pressure medium additionally allows a very precise, quasi-hysteresis-free regulation of the torque transfer in both actuation directions, particularly at low torques, so that tooth-on-tooth positions in the transmission can be resolved.

The use of a friction clutch engaged using actuating force has the additional advantages of a comparatively low play and a small axial construction size. Furthermore, improved clutch dynamics can be attained in the activation.

The pressure element, designed for example as a pressure plate, and the form-locking element, designed for example as a form-locking plate equipped with claws or teeth, can be acted upon by the assigned actuating pistons via axial bearings.

The torque transferred by the friction clutch can be advantageously regulated via a pressure sensor, such that a comfortable and effective slip operation is attained during the temporary use of the friction clutch. The engaging or disengaging process and the position of form-locking clutch, designed for example as a dog clutch or gear coupling, can be advantageously controlled and monitored using a simple position sensor system.

Instead of the particularly advantageous arrangement having two pneumatically controlled actuating pistons and two cylinders, in principle, a design having one cylinder and two actuating pistons, or having one cylinder with an actuating piston and a conventional disc-spring friction clutch that can be bridged, controlled by a position sensor, is also possible.

The design of the through-connection clutch according to the invention and the actuation thereof can be implemented controlled completely by pressure medium, that is, completely without spring means, which reduces costs. Naturally however, spring means can also be provided, for example for ensuring an air gap in the case of a clutch disengaged without pressure, for creating a return force counter to the actuating direction of the actuating pistons, for creating a preload of the actuating pistons, or for spring loading the friction facings of the friction clutch.

The through-connection clutch according to the invention can be provided particularly in a commercial vehicle having an internal combustion engine with high torque and an automatic transmission for transferring torque during travel, and additionally for the functions of a startup, maneuvering, and engaging and disengaging the drive train when shifting gears.

Accordingly, the through-connection clutch provides the basic functions of a conventional startup clutch and a multiplicity of additional functions, of which a few are named in the following:

In principle, equalization of the rotational speed between the internal combustion engine and the transmission input can occur in the same manner as with a conventional clutch by means of friction.

During startup procedures, the engine and transmission input can be synchronized using the friction clutch according to the driver's wishes, and subsequently the rotationally fixed form-locking connection can be engaged.

During maneuvering procedures, with the form-locking clutch disengaged, the engine and the transmission input can be synchronized to each other with respect to the rotational speeds thereof using a friction clutch.

With the drive train engaged, the torque transfer occurs exclusively via the form-locking connection.

The form-locking connection is engaged upon detection of equal engine rotational speed and transmission input rotational speed. When the form-locking connection is produced, the engaging force on the friction clutch can be released.

The clutch can be disengaged during a shifting procedure in principle by separating the form-locking connection, if the friction clutch was already disengaged after producing the form-locking. However, to prepare for the shifting procedure, initially the friction clutch can also be reengaged, then, the form-locking connection can be disengaged and subsequently a targeted torque reduction can occur via the friction clutch.

A targeted reduction of torque via the frictional clutch can also be used for vehicle coasting, or particularly with the use of a known drive-less rolling or coasting mode.

A required reduction of torque can also occur, however, using a targeted influence of the engine torque such that for starting the rolling or coasting phase of the vehicle, the clutch can be disengaged directly without prior slip operation of the friction clutch by removing the form-locking connection. Thereby, the friction clutch is used less frequently.

Furthermore due to the design of the friction clutch as a clutch that is engaged using engaging force, it is possible during vehicle standstill and with the transmission shifted into neutral, to keep the through-connection clutch disengaged without permanent actuation with the engine running or switched off. In particular, in the case of a running engine, the so-called transmission rattling can thus be avoided, thereby improving the operating comfort.

However, it is also possible, using the form-locking clutch, to engage the clutch during vehicle standstill and with the transmission shifted into neutral, and to maintain this engagement substantially without permanent actuation. Thereby, a transmission-side oil pump can be operated for example during vehicle standstill.

Furthermore, it is possible to disengage the clutch solely by separating the form-locking connection during shifting, with a disengaged friction clutch, after setting the drive train torque-free by influencing the engine.

Conversely, it is also possible to engage the clutch after a shifting operation without actuating the friction clutch, by solely engaging the form-locking clutch, if the engine speed was previously synchronized by influencing the engine.

BRIEF DESCRIPTION OF THE DRAWING

For illustrating the invention, the description is accompanied by a drawing with an exemplary embodiment. The sole FIGURE shows a schematically simplified through-connection clutch in a longitudinal section. This through-connection clutch is designed as a pneumatically-actuatable clutch arrangement 1, as can be disposed in the drive train of a commercial vehicle between an internal combustion engine and an automatically shifted step-up gearing.

DETAILED DESCRIPTION OF THE PREFERRED EMBODIMENTS

The clutch arrangement 1 comprises a radially outer friction clutch 2 and a radially inner form-locking clutch 3. A clutch input side 4, which is connected in a rotationally fixed manner to a clutch drive shaft 5, for instance the crankshaft of the internal combustion engine, comprises the flywheel 6 of the engine, which supports a friction facing 7, and a gearing 8 axially recessed radially within the friction surface. A clutch output side 9 comprises a pressure plate 10 having a friction surface and a form-locking element 12 with a counter gearing 13 corresponding to the gearing 8 of the clutch input side 4. The pressure plate 10 and form-locking element 12 are disposed rotationally fixed together and axially movable against each other on a clutch output shaft 14, for example a transmission input shaft. A clutch disc 11 that is shown here without a torsional damper, is located between the flywheel 6 and the pressure plate 10, and has friction facings on both sides which each interact with the friction facing 7 of the flywheel 6 and with the friction surface of the pressure plate 10.

The friction clutch 2 and the form-locking clutch 3 can each be activated via a separate actuation unit 15 that encompasses the clutch output shaft 14. The actuation unit 15 can be designed based on the ConAct (Concentric Actuation) clutch system known from the applicant. With the ConAct system, the conventional clutch actuation with a fork actuation member, a clutch force booster, a fork and releaser is replaced by a pneumatic release cylinder disposed concentrically about the transmission input shaft, resulting in operational advantages and cost savings.

The actuation unit 15 comprises two concentric ring cylinders 16, 17. A first actuating piston 18 is guided axially in the outer ring cylinder 16 and can be actuated under the control of pressure medium via a first pressure medium supply 19 in the direction of engagement for exerting contact pressure on the pressure plate 10 of the friction clutch 2. The actuating piston 18 interacts with the pressure plate 10 via a first axial bearing 22. For ensuring an air gap between the friction facings, or friction surfaces, in the pressureless state, a spring means 24, effective in the direction of disengagement of the piston 18, is disposed in the cylinder space of the outer ring cylinder 16.

A second actuating piston 20 is guided axially in the radially inner ring cylinder 17 and can be activated by a second pressure medium supply 21, operating bidirectionally. The actuating piston 20 comprises a second axial bearing 23 having the form-locking element 12 such that the form-locking connection can be produced, as well as removed, by means of the actuating piston 20.

In order to connect the two clutch sides 4, 9 together in a rotationally fixed manner, initially the outer actuating piston 18 is pressurized with pressure medium for the purpose of synchronization between the engine and the transmission, whereby the piston is slid in the actuating cylinder 16 thereof, and the pressure plate 10 is moved in the direction toward the input-side friction ring 6 until the corresponding friction surfaces come into mutual contact. The contact pressure is increased in a regulated manner in slip operation via a known control device with a pressure sensor system, not shown, until there is equal rotational speed on both sides of the clutch 4, 9, and with it, frictional connection or near frictional connection between the drive shaft 5 and the transmission input shaft 14.

The form-locking connection is produced immediately next to, or overlapping with, the frictional connection, in that the form locking part 12 is slid axially outward by the inner actuating piston 20, which is actuated by pressure medium, whereby the engine-side gearing 8 and the transmission-side counter gearing 13 are brought into engagement. When the form-locking connection is engaged, the outer actuating piston 18 can be depressurized, and thus the engaging force can be removed from the friction clutch 2.

For removing the form-locking connection, the inner actuating piston 20 is pressurized with an actuating pressure in the direction of disengagement, whereby the form-locking element 12 is pulled back. The actual position of the form-locking clutch 3 is monitored by a position sensor, not shown.

Depending on the operating situation, for instance during a startup procedure or during shifting procedures for changing gears, the friction clutch 2 is activated in a targeted manner only as long as is necessary in order to produce or remove the form-locking connection in the drive train between the engine and the transmission input in a reliable and comfortable manner.

LIST OF REFERENCE SYMBOLS 1 clutch arrangement
2 friction clutch
3 form-locking clutch
4 clutch input side
5 clutch drive shaft
6 friction ring
7 friction facing
8 gearing
9 clutch output side
10 pressure plate
11 clutch disc
12 form-locking element
13 gearing
14 clutch output shaft
15 actuation unit
16 ring cylinder
17 ring cylinder
18 actuating piston
19 pressure medium supply
20 actuating piston
21 pressure medium supply
22 axial bearing
23 axial bearing
24 spring means

The invention claimed is:

1. A through-connection clutch, for transferring torque between a drive motor and a transmission of a motor vehicle, the through-connection clutch comprising:
an activatable friction clutch (2) and an engageable form-locking clutch (3),
the form-locking clutch (3) being disposed radially within the friction clutch (2),
the friction clutch (2) and the form-locking clutch (3) being actuatable independently of each other,
a pressure plate (10) of the friction clutch (2) and a form-locking element (12) of the form-locking clutch (3) being disposed concentrically, rotationally fixed together, and movable against each other, and being actuatable via an actuation unit (15),
the actuation unit (15) being rotationally decoupled from the pressure plate (10) and the form-locking element (12), and
the form-locking clutch (3) being actuatable in a direction of engagement and in a direction of disengagement under the control of pressure medium.

2. The through-connection clutch according to claim 1, wherein the actuation unit (15) comprises a radially outer actuating piston (18) for the friction clutch (2) and a radially inner actuating piston (20) for the form-locking clutch (3), the radially outer and the radially inner actuating pistons (18, 20) are each guided in a separate actuating cylinder (16, 17).

3. The through-connection clutch according to claim 1, wherein the form-locking element (12) and the pressure plate (10) interact with the associated actuating pistons (18, 20) via axial bearings (22, 23).

4. The through-connection clutch according to claim 1, wherein torque transferred via the friction clutch (2) is regulatable using a pressure sensor.

5. The through-connection clutch according to claim 1, wherein displacement of the form-locking clutch (3) is set and monitored using a position sensor.

6. The through-connection clutch according to claim 1, wherein the form-locking clutch (3) is one of a dog clutch and a gear coupling.

7. The through-connection clutch according to claim 1, wherein the actuation unit (15) is one of pneumatically and hydraulically activated.

8. The through-connection clutch according to claim 1, wherein spring mechanism (24) is disposed which is effective for at least one of ensuring an air gap for at least one of the friction clutch and the form-locking clutch (2, 3) that is disengaged, when depressurized, and for producing a return force counter to an actuating direction of at least of one actuating piston (18, 20) and creating a preload of at least one actuating piston (18, 20) of the actuation unit (15).

9. A through-connection clutch for transmitting torque, the through-connection clutch comprising:
a friction clutch (2) having a pressure plate (10);
a form-locking clutch (3) being disposed radially within the friction clutch (2);
the friction clutch (2) and the form-locking clutch (3) being actuatable independently of each other, the pressure plate (10) of the friction clutch (2) and a form-locking element (12) of the form-locking clutch (3) being concentric and continuously rotationally connected to each other;
the friction clutch (2) and the form-locking clutch (3) being axially movable with respect to each other, and being actuatable via an actuation unit (15);
the actuation unit (15) being rotatable with respect to the pressure plate (10) and the form-locking element (12); and
the form-locking clutch (3) being actuatable by a pressure medium in an engagement direction and a disengagement direction.

* * * * *